United States Patent [19]

Tokuda

[11] 4,285,855

[45] Aug. 25, 1981

[54] FIRE-RETARDANT POLYCARBONATE COMPOSITION

[75] Inventor: Toshimasa Tokuda, Iyo, Japan

[73] Assignee: Teijin Chemicals Ltd., Tokyo, Japan

[21] Appl. No.: 131,852

[22] Filed: Mar. 19, 1980

Related U.S. Application Data

[62] Division of Ser. No. 958,487, Nov. 7, 1978, Pat. No. 4,222,910.

[30] Foreign Application Priority Data

| Nov. 10, 1977 | [JP] | Japan | 52-134107 |
| Dec. 21, 1977 | [JP] | Japan | 52-152969 |
| Jan. 19, 1978 | [JP] | Japan | 53-3749 |
| Aug. 16, 1978 | [JP] | Japan | 53-99017 |
| Aug. 16, 1978 | [JP] | Japan | 53-99018 |

[51] Int. Cl.$^3$ .................. C08K 5/42; C08L 81/08; C08L 69/00
[52] U.S. Cl. .................. 260/45.75; 525/469; 525/470; 528/171; 528/174
[58] Field of Search .................. 528/174, 171; 525/470, 525/462, 433, 437, 439, 469; 260/45.7 S, 45.7

[56] References Cited

U.S. PATENT DOCUMENTS

| 3,475,373 | 10/1969 | Jackson et al. | 525/470 |
| 3,833,685 | 9/1974 | Wamback | 525/470 |
| 3,836,490 | 9/1974 | Bockmann et al. | 260/18 TN |
| 3,855,277 | 12/1974 | Fox | 260/45.75 B |
| 4,093,590 | 6/1978 | Mark | 525/470 |
| 4,214,062 | 7/1980 | Binsack et al. | 525/462 |

FOREIGN PATENT DOCUMENTS

2149311  4/1973  Fed. Rep. of Germany .

*Primary Examiner*—V. P. Hoke
*Attorney, Agent, or Firm*—Sherman & Shalloway

[57] ABSTRACT

A resin composition having an excellent fire retarding effect is provided which comprises (1) a polycarbonate and (2) as a fire retardant, at least one member of the group consisting of (A) a metal salt of a sulfuric ester of an alcohol, (B) an ether derived from an alkyl alcohol and a phenol and having a metal sulfonate group bonded to the carbon atom of the alkyl group and (C) a polycarbonate having at least one alkali metal sulfonate group bonded to the terminals through alkyl. Addition of a mixture of the component (A) and at least one specified halogen-containing organic compound as the fire retardant to the polycarbonate (1) affords a resin composition having a greater fire retardant effect.

9 Claims, No Drawings

FIRE-RETARDANT POLYCARBONATE COMPOSITION

This is a division of application Ser. No. 958,487, filed Nov. 7, 1978, now U.S. Pat. No. 4,222,910.

BACKGROUND OF THE INVENTION

This invention relates to a fire-retardant polycarbonate composition.

With the increasing demand for the safety of synthetic resins in recent years, higher levels of fire retardancy have been required in providing fire-retardant polycarbonate resins. A number of methods for rendering polycarbonates fire-retardant have been known. Many of them involve the addition of large quantities of organic halogen compounds to polycarbonate resins, as typically shown by the method described in U.S. Pat. No. 3,855,277 which comprises adding poly[2,2- bis(3,5-dibromo-4-hydroxyphenyl)propane carbonate] to a polycarbonate in an amount of as large as 10 to 20% by weight based on the latter. These methods, however, have the defect that toxic gases are generated during combustion, and particularly, the impact strength of the resin is markedly deteriorated.

Addition of inorganic salts has been suggested as one method of remedying this defect. For example, there have been suggested a method of rendering a polycarbonate resin fire-retardant by adding an inorganic sulfite, thiosulfite, dithionite or pyrosulfite to it (see Japanese Laid-Open Patent Publication No. 17558/77), and a method of rendering a polycarbonate resin fire-retardant by adding both such a salt and an organic halogen compound (see Japanese Laid-Open Patent Publication No. 17557/77). However, the use of these inorganic salts causes the defect of markedly degrading the impact strength of the polycarbonate. Furthermore, since these inorganic salts are insoluble in polycarbonate resins, their inclusion impairs the transparency of the polycarbonate resins. Moreover, a sufficient fire retarding effect cannot be obtained unless an organic halogen compound is added.

As other types of improvement, U.S. Pat. No. 4,036,502 discloses a method which involves adding a sulfonic acid metal salt of an aromatic ether, and U.S. Pat. No. 3,978,024 discloses a method which comprises adding a polycarbonate having a metal sulfonate group introduced into the aromatic ring. The fire retarding effects provided by these methods are insufficient, and the thermal stability of the resins is reduced.

The present inventor has now found a novel and excellent fire-retarding agent for polycarbonate resins, and therefore, a fire-retardant polycarbonate composition having superior impact strength and transparency and excellent fire retarding properties which does not generate toxic gases during combustion.

SUMMARY OF THE INVENTION

According to this invention, there isspovided a fire-retardant polycarbonate composition comprising (1) a polycarbonate, and (2) as a fire retardant, at least one compound selected from the group consisting of (A) metal salts of sulfuric esters of at least one alcohol selected from the group consisting of monohydric alcohols containing 1 to 30 carbon atoms and unsubstituted or substituted by halogen and polyhydric alcohols containing 2 to 40 carbon atoms and unsubstituted or substituted by halogen, (B) ethers derived from alkyl alcohols and at least one phenol selected from the group consisting of monohydric phenols containing 6 to 40 carbon atoms unsubstituted or substituted by halogen and polyhydric phenols containing 6 to 40 carbon atoms and unsubstituted or substituted by halogen, in which the alkyl group contains 1 to 10 carbon atoms and metal sulfonate groups are attached to the carbon atoms of the alkyl group, and (C) compounds of the formula

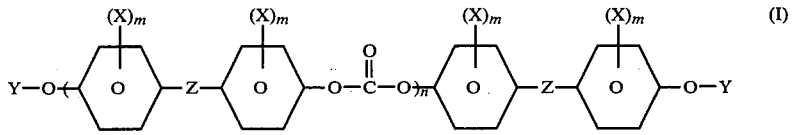

wherein X represents a halogen atom, m is an integer of 0 to 4, Y independently represents a hydrogen atom, an aliphatic or aromatic group containing 1 to 20 carbon atoms, or the group —R—SO$_3$M in which R represents an alkylene group containing 1 to 10 carbon atoms and M represents an alkali metal or an alkaline earth metal, at least one of the Y groups being the group —R—SO$_3$M, and Z represents an alkylene or alkylidene group containing 1 to 9 carbon atoms, a cycloalkylene or cycloalkylidene group containing 5 to 15 carbon atoms, O, S, SO, SO$_2$, CO or CO$_2$, and n is a number of 1 to 200.

DETAILED DESCRIPTION OF THE INVENTION

The polycarbonate used in this invention is produced by the reaction of a dihydric phenol with phosgene or a carbonic acid diester. Bisphenols are preferred as the dihydric phenol, and 2,2-bis(4-hydroxyphenyl)propane (bisphenol A) is especially preferred. The bisphenol A may be substituted partly or wholly by another dihydric phenol compound. Examples of other dihydric phenol compounds than bisphenol A include hydroquinone, 4,4'-dihydroxydiphenyl, bis(4-hydroxyphenyl)alkanes, bis(4-hydroxyphenyl)cycloalkanes, bis(4-hydroxyphenyl)sulfide, bis(4-hydroxyphenyl)sulfoxide, bis(4-hydroxyphenyl)sulfone, bis(4-hydroxyphenyl)ether, bis(4-hydroxyphenyl)ketone, and 4'-hydroxyphenyl 4-hydroxybenzoic acid esters; or halogen-substituted products of these compounds. Homopolymers of these dihydric phenols or copolymers of two or more of these dihydric phenols, and blends of these polymers or copolymers can also be used.

The compound (A) used as a fire retardant in the composition of this invention is a metal salt of a sulfuric ester of a mono-hydric alcohol containing 1-30 carbon atoms or polyhydric alcohol containing 2 to 40 carbon atoms which is unsubstituted or substituted by halogen. The metal is preferably an alkali metal or an alkaline earth metal. Preferred monohydric alcohols are alkyl alcohols, cycloalkyl alcohols and aralkyl alcohols. On the other hand, glycol, glycerol and pentaerythritol are preferred as polyhydric alcohols.

It has not been known to use metal salts of sulfuric acid ester as fire-retardants for polycarbonate resins.

The present inventor has found that polycarbonate compositions containing the metal salts of sulfuric esters have satisfactory fire retardancy, transparency and impact strength. An important feature of these resin compositions is that they also have good thermal stability. It is unexpected that the metal salts of sulfuric esters permit far better transparency than the corresponding organic sulfonic acid metal salts.

Examples of suitable compounds (A) used in this invention are sodium methyl sulfate, sodium ethyl sulfate, sodium lauryl sulfate, sodium hexadecyl sulfate, potassium methyl sulfate, potassium ethyl sulfate, potassium lauryl sulfate, potassium hexadecyl sulfate, sodium polyoxyethylene alkyl ether sulfate, potassium polyoxyethylene alkyl ether sulfate, sodium polyoxyethylene alkyl phenyl ether sulfate, potassium polyoxyethylene alkyl phenyl ether sulfate, sodium mono- or di-sulfates of ethylene glycol, propylene glycol or butane diol (examples of the sodium monosulfates are sodium ethylene glycol monolaurate monosulfate and sodium propylene glycol monostearate monosulfate), sodium mono-, di-, tri- or tetra-sulfates of pentaerythritol, sodium glycerol monolaurate monosulfate, sodium glycerol monopalmitate monosulfate, sodium glycerol monostearate monosulfate, sodium glycerol 1,3-bis(2-ethylhexyl) ether monosulfate, and sodium salt of a sulfated phenoxy resin. Halogen-substitution products of these compounds may also be used. These compounds may be used alone or as a mixture of two or more.

The amount of the compound (A) is, for example, 0.001 to 2% by weight, preferably 0.01 to 1% by weight, based on the polycarbonate composition.

The compound (B) used as a fire retardant agent in the present invention is an ether derived from an alkyl alcohol having 1 to 10 carbon atoms and a mono- or polyhydric phenol containing 6 to 40 carbon atoms and unsubstituted or substituted by halogen, in which metal sulfonate groups are bonded to the carbon atoms of the alkyl group. The metal is preferably an alkali metal or an alkaline earth metal. In order for the compound (B) to exhibit superior performance as a fire retardant, it is necessary that the metal sulfonate groups of the compound (B) should be bonded to the alkyl group. Aromatic-aliphatic ethers containing metal sulfonate groups directly bonded to the aromatic ring are inferior to the compounds (B) in fire retarding effect and transparency.

The compound (B) can be prepared, for example, by reacting an unsubstituted or halogen-substituted phenol such as phenol, naphthol, phloroglucinol, bisphenol A, bis-(4-hydroxyphenyl)oxide, bis(4-hydroxyphenyl) sulfide, or bis-(4-hydroxyphenyl)sulfone with a sulfoalkyl halide or a sultone in the presence of an alkaline catalyst to induce sulfoalkylation. Examples of suitable compounds (B) used in this invention are phenyl (γ-sodium sulfopropyl) ether, 1-(β-sodium sulfoethoxy) naphthalene, hydroquinone bis-(γ-sodium sulfopropyl) ether, 4-hydroxyphenyl(γ-sodium sulfopropyl) ether, 4-methoxyphenyl(γ-sodium sulfobutyl) ether, 3,5-dihydroxyphenyl(γ-sodium sulfopropyl) ether, 4-phenoxyphenyl (β-sodium sulfoethyl) ether, 2,2-bis(4-γ-sodium sulfopropoxyphenyl)propane, 1,1-bis(4-β-sodium sulfoethoxyphenyl) cyclohexane, bis(4-γ-sodium sulfobutoxyphenyl)ether, bis(4-γ-sodium sulfopropoxyphenyl)sulfide, bis(4-β-sodium sulfoethoxyphenyl)sulfoxide, bis(4-γ-sodium sulfopropoxyphenyl) sulfone, bis(4-γ-sodium sulfopropoxyphenyl)ketone, 2-(4-hydroxyphenyl)-2-(4-γ-sodium sulfopropoxyphenyl)propane, 4-hydroxyphenyl-4'-sodium sulfopropoxyphenylsulfone, 2-(4-methoxyphenyl)-2-(4'-β-sodium sulfoethoxyphenyl)propane, 4-phenoxyphenyl-4'-γ-sodium sulfobutoxyphenylsulfone, and 2,2-bis(2-methoxy-4-γ-sodium sulfopropoxyphenyl)propane; and other metal salts corresponding to the above sodium salts, such as potassium, calcium, barium and strontium salts. Halogen-substitution products of these compounds may also be used. These compounds may be used singly or as a mixture of two or more.

The amount of the compound (B) is, for example, 0.001 to 5% by weight, preferably 0.01 to 2% by weight, based on the polycarbonate resin.

The compound (C) of formula (I) used as a fire retardant in the composition of this invention is a polycarbonate containing a metal sulfonate group at a part or the whole of the terminals. In order for the compound (C) to exhibit superior performance as a fire retardant, the metal sulfonate groups of the compound (C) should be bonded to the carbon atoms of the terminal alkyl groups. Polycarbonates having a metal sulfonate group directly bonded to the aromatic ring are inferior to the compounds (C) in fire retarding effect and transparency.

The compound (C) can be prepared, for example, by reacting a polycarbonate having at least one hydroxyl group at the terminal with a sulfoalkyl halide or a sultone in the presence of an alkaline catalyst. Suitable compounds (C) used in this invention are, for example, homo- or copolycarbonates which are derived from unsubstituted or halogen-substituted bisphenol A or at least one dihydric phenol other than bisphenol A, and which contain at least one metal alkylsulfonate group in at least one of the terminals.

The effective amount of the compound (C) to be added is at least 0.001% by weight, preferably 0.01 to 2% by weight, based on the polycarbonate resin.

The fire retardant is added to the polycarbonate resin by usual blending methods, for example by dry blending methods using a supermixer or tumbler.

The polycarbonate composition of this invention can be molded into the form of pellets or sheet by an ordinary method using a vent-type extruder, for example. The pellets can be processed into various shaped articles by ordinary molding methods.

Since the fire retardant used in this invention has good compatibility with the polycarbonate, it is uniformly dissolved and dispersed in the resin.

In addition to the aforesaid fire retarding compounds, the composition of this invention may further contain ordinary additives such as stabilizers, mold releasing agents, lubricants, extenders, reinforcing agents (e.g., glass fibers or carbon fibers), blowing agents, dyes, pigments, antistatic agents, and ultraviolet light absorbers.

The burning test described in Underwriters Laboratories, Inc., Bulletin -94 (to be referred to as UL-94 test) is widely used to test the fire retardancy of resin compositions. According to the UL-94 test, the degree of fire retardancy is measured by a vertical burning test, and rated V-0, V-1 or V-2. V-0 represents high fire retardancy; V-1, medium fire retardancy; and V-2, low fire retardancy. Samples which are rated V-2 are regarded as having fairly acceptable fire retardancy. Those samples which are not acceptable by the V-2 standards shall be tested by a horizontal burning test whose criteria are less rigorous. When a sample is found to be acceptable by this test, it is rated HB. Samples which meet the criteria of V-0 are generally regarded as having satisfactory fire retardancy. A 5V test employs far more rigorous conditions than the conditions for the vertical burning test, and a sample which meets the criteria of the V-0 rating might not be acceptable by the 5V test.

The 5V test consists of a test on a set of five bar samples and a test on a set of five plaque samples, and the criteria of rating and roughly as follows:

Bar sample testing method

A burner is ignited. The overall height of the flame is adjusted to 127 mm, and the height of the inner blue cone, to 38 mm. The burner is inclined at an angle of 20° from the vertical position. The tip of the blue cone is contacted with the lower end of a vertically suspended sample for 5 seconds and then withdrawn for 5 seconds. This cycle is repeated five times. The criteria of acceptance are that the sample does not burn for more than 60 seconds, nor drips.

Plaque sample testing method

A similar burner flame is contacted in the same way as above with a vertically suspended sample at its corners at the lower end, the edge of its lower end, the center of its one side, and the horizontal surface of the sample downwardly for 5 seconds, and then withdrawn for 5 seconds. This cycle is repeated five times. The criteria for acceptance are that the sample does not burn for more than 60 seconds, nor drips, nor is damaged markedly.

Samples which meet the criteria of the 5V test are regarded as having the highest fire retardancy.

The polycarbonate composition of this invention usually has a rating of V-0, and therefore, has satisfactory fire retardancy for most applications. In many cases, it is difficult for the composition of this invention to meet the criteria of the 5V test. The present inventor has found that a composition prepared by adding a mixed fire retardant composed of the compound (A) and at least one halogen-containing organic compound selected from organic monomeric aromatic halogen compounds, organic polymeric aromatic halogen compounds and fluorinated polyolefins to a polycarbonate resin has a very high level of fire retardancy which meets the 5V test criteria.

Examples of preferred organic monomeric aromatic halogen compounds are decabromodiphenyl ether, an isopropylidene (2,6-dihalo-p-phenylene) bis(-polyhalophenyl) carbonate, decabromodiphenyl carbonate, and hexabromobenzene. Examples of preferred organic polymeric aromatic halogen compounds are tetrachlorobisphenol A polycarbonate, and tetrabromobisphenol A polycarbonate. Preferred fluorinated polyolefins are polymers of the fluorinated products of olefins such as ethylene or propylene. Specific examples are polytetrafluoroethylene, a tetrafluoroethylene/hexafluoropropylene copolymer, polytrifluorochloroethylene, polyvinylidene fluoride, an ethylene/tetrafluoroethylene copolymer.

The amount of the compound (A) in the mixed fire retardant is generally 0.001 to 2% by weight, preferably 0.005 to 0.5% by weight, based on the polycarbonate, and the amount of the halogen-containing organic compound is preferably 0.1 to 10% by weight.

Addition of tetrabromobisphenol A polycarbonate [i.e., poly(2,2-bis(3,5-dibromo-4-hydroxyphenyl) propane carbonate)] alone to a polycarbonate resin as a fire retardant is known, but in order to obtain a satisfactory fire retarding effect, it must be added in an amount of at least 10% by weight, preferably as large as 12 to 20% by weight. Such large quantities of the fire retardant inevitably cause the defect of the marked reduction of impact strength. However, the mixed fire retardant used in this invention which consists of the above halogenated polycarbonate and the compound (A) can impart a high level of fire retardancy which meets the 5V test criteria of UL-94 even when used in a very small amount of, say, less than 1% by weight. This is considered to be due to the synergistic effect of the two compounds. Moreover, with the above mixed fire retardant, the defect of reduced impact strength can be completely removed, and the transparency of the composition is also good.

Furthermore, as stated hereinabove, polycarbonate compositions containing compound (A) as a fire retardant have good thermal stability. The use of the mixed fire retardant composed of compound (A) and the halogen-containing organic compound can afford good thermal stability.

The following examples illustrate the present invention more specifically. The fire retardancy in these examples was rated in accordance with the UL-94 test of Underwriters Laboratories, Inc., U.S.A. The impact strength was evaluated in accordance with ASTM D-256. The transparency was measured by an integral sphere type HTR meter (Type SEP-H-2, a product of Nippon Seimitsu Kogaku Kabushiki Kaisha) in accordance with JIS K-6719.

EXAMPLE 1

Each of the additives shown in Table 1 was added in the amounts indicated to a powder of polycarbonate (average molecular weight 25,000) derived from bisphenol A, and each of the mixtures was stirred for 10 minutes at a speed of 500 rpm by a supermixer. The mixture was pelletized by a vent-type 30 mm-diameter extruder at a temperature of 250° to 280° C. (When additive D was used, the resulting mixture was dried at 120° C. for 6 hours by a hot air dryer before stirring in the supermixer). The pellets were dried at 120° C. for 6 hours, and molded by an injection molding machine to form three types of test specimens, i.e. a specimen A having a size of 127 mm × 12.7 mm × 1.6–3.2 mm, a specimen B having a size of 70 mm × 50 mm × 2 mm, and a specimen C having a size of 64 mm × 12.7 mm × 3.2 mm. Specimen A was used for the UL-94 test; specimen B, for testing transparency; and specimen C, for testing impact strength. The results are shown in Table 1.

Runs Nos. 1 to 9 used compositions of this invention which contained the sodium salts of sulfuric esters [compound (A)] as a fire retardant. Run No. 10 used a composition for comparative purposes which did not contain a fire retardant. Run No. 11 used a composition for comparative purposes which contained a sodium alkylsulfonate instead of the sodium salt of sulfuric ester. The experimental results given in Table 1 show that the composition containing the sodium alkylsulfonate as a fire retardant (Run No. 11) had markedly reduced transparency.

TABLE 1

Properties of the injection-molded articles

| Run No. | Additive | Amount of additive (%) | Haze (%) | Izod impact strength (kg · cm/cm) | Average flame out time (seconds) | Drips per 10 contacts of flame | UL-94 rating |
|---|---|---|---|---|---|---|---|
| 1 |  | 0.01 | 2.8 | 81 | 10.3 | 6 | V-2 |
| 2 | A | 0.1 | 3.7 | 80 | 1.6 | 0 | V-0 |
| 3 |  | 0.2 | 4.5 | 79 | 0.5 | 0 | V-0 |
| 4 |  | 0.05 | 2.4 | 80 | 5.6 | 3 | V-2 |
| 5 | B | 0.1 | 3.5 | 80 | 5.5 | 2 | V-2 |
| 6 |  | 0.2 | 4.0 | 79 | 1.5 | 0 | V-0 |
| 7 | C | 0.1 | 4.0 | 79 | 4.5 | 0 | V-0 |
| 8 | D | 0.1 | 5.3 | 78 | 5.8 | 0 | V-0 |
| 9 |  | 0.2 | 6.5 | 75 | 3.4 | 0 | V-0 |
| 10 (comparison) | None | 0 | 1.0 | 80 | 14.8 | 9 | HB |
| 11 (comparison) | E | 0.1 | 44.8 | 81 | 3.1 | 0 | V-0 |

Note
Additive A to E shown in Table 1 were as follows:
A: sodium lauryl sulfate
B: sodium hexadecyl sulfate
C: potassium stearyl sulfate
D: Turkey red oil (a sodium salt of a sulfate ester of castor oil)
E: Mixed sodium alkylsulfonates with mixed $C_{10}$–$C_{18}$ alkyl groups most of which are $C_{14}$ alkyl groups.

EXAMPLE 2

Each of the additives shown in Table 2 was added in the amounts indicated to the same polycarbonate powder as used in Example 1. Three types of specimens were prepared from each of the mixtures and tested in the same way as described in Example 1. The results are shown in Table 2.

Runs Nos. 1 to 18 in Table 1 used compositions of this invention containing aromatic-aliphatic ethers having a metal sulfonate group bonded to the alkyl group [compound (B)] as a fire retardant. Run No. 19 used a composition for comparative purposes which did not contain a fire retardant. Runs Nos. 20 to 24 used compositions for comparative purposes which contained as a fire retardant aromatic-aliphatic ethers (Runs Nos. 20 to 22) and aromatic-aromatic ethers (Runs Nos. 23 and 24) which had a metal sulfonate group bonded directly to the aromatic ring.

The experimental results given in Table 2 show that the fire retardants used in this invention impart fire retardancy rated V-0 to a polycarbonate resin without impairing its transparency and impact strength. The fire retardants used for comparative purposes afford fire retardancy rated V-2, but not V-0, with a deleterious effect on transparency.

TABLE 2

| Run No. | Additive | Amount of additive (%) | Haze (%) | Izod impact strength (kg · cm/cm) | Average flame out time (seconds) | Drips per 10 contacts of flame | UL-94 rating |
|---|---|---|---|---|---|---|---|
| 1 | A | 0.05 | 1.2 | 80 | 5.3 | 0 | V-0 |
| 2 |  | 0.1 | 1.5 | 80 | 2.1 | 0 | V-O |
| 3 |  | 0.05 | 1.8 | 80 | 4.5 | 0 | V-O |
| 4 | B | 0.1 | 2.3 | 80 | 1.3 | 0 | V-O |
| 5 |  | 0.2 | 2.8 | 77 | 0.8 | 0 | V-O |
| 6 |  | 1.0 | 4.5 | 75 | 0.5 | 0 | V-O |
| 7 | C | 0.05 | 2.0 | 80 | 2.5 | 0 | V-O |
| 8 |  | 0.1 | 4.1 | 79 | 1.2 | 0 | V-O |
| 9 | D | 0.05 | 1.2 | 80 | 5.1 | 0 | V-O |
| 10 |  | 0.1 | 1.5 | 77 | 2.1 | 0 | V-O |
| 11 | E | 0.05 | 1.3 | 80 | 4.6 | 0 | V-O |
| 12 |  | 0.2 | 2.3 | 78 | 1.8 | 0 | V-O |
| 13 |  | 1.0 | 4.5 | 77 | 0.6 | 0 | V-O |
| 14 | F | 0.05 | 1.5 | 79 | 4.3 | 0 | V-O |
| 15 |  | 0.1 | 2.2 | 78 | 2.0 | 0 | V-O |
| 16 | G | 0.05 | 1.8 | 79 | 2.5 | 0 | V-O |
| 17 |  | 0.2 | 2.5 | 79 | 1.6 | 0 | V-O |
| 18 |  | 1.0 | 4.6 | 77 | 0.5 | 0 | V-O |
| 19 (comparison) 20 | None | 0 | 1.0 | 80 | 14.8 | 9 | HB |

TABLE 2-continued

| Run No. | Additive | Amount of additive (%) | Haze (%) | Izod impact strength (kg · cm/cm) | Average flame out time (seconds) | Drips per 10 contacts of flame | UL-94 rating |
|---|---|---|---|---|---|---|---|
| (comparison) 21 | H | 0.1 | 17.5 | 82 | 7.1 | 1 | V-2 |
| (comparison) 22 | I | 0.1 | 11.2 | 82 | 4.9 | 3 | V-2 |
| (comparison) 23 | J | 0.05 | 11.3 | 72 | 10 | 3 | V-2 |
| (comparison) 24 | K | 0.1 | 16.5 | 73 | 4.7 | 5 | V-2 |
| (comparison) | L | 0.1 | 6.9 | 74 | 4.9 | 3 | V-2 |

The additives shown in Tables 2 were as follows:
A: phenyl (1-sodium sulfopropyl)ether,
B: 2,4,6-tribromophenyl(γ-sodium sulfopropyl)ether,
C: hydroquinone-bis(γ-sodium sulfopropyl)ether,
D: 2,2-bis(4-γ-sodium sulfopropoxyphenyl)propene,
E: 2,2-bis(3,5-dibromo-4-γ-sodium sulfopropoxy-phenyl) propane,
F: 2,2-bis(4-γ-sodium sulfopropoxyphenyl)sulfone,
G: 2,2-bis(3,5-dibromo-4-γsodium sulfopropoxy-phenyl)sulfone,
H: sodium p-methoxybenzenesulfonate,
I: sodium 3,5-dichloro-2-methoxybenzenesulfonate,
J: compound resulting from the bonding of one sodium sulfonate group to the 2-position of the benzene ring of 2,2-bis(3,5-dibromo-4-methoxyphenyl)propane,
K: sodium p-phenoxybenzenesulfonate,
L: sodium 5-bromo-2-(4'-bromophenoxy)benzene-sulfonate.

Additives A, B, D and E used in Example 2 were prepared by the following procedures.

Additive A

Sodium hydroxide was added to 9.4 g of phenol to form a phenolate. Propane sultone (12.2 g) was added to the phenolate, and the mixture was stirred under heat to form a white solid. The solid was washed with methanol and dried.

Additive B

Sodium hydroxide was added to 33.1 g of 2,4,6-tribromophenol to form a phenolate. Propanesultone (12.2 g) was added to the phenolate, and the mixture was stirred under heat to form a white solid. The solid was washed with methanol and dried.

Additive D

Sodium hydroxide was added to 5.6 g of bisphenol A to form a phenolate. Propane sultone (4.9 g) was added to the phenolate, and the mixture was stirred under heat to form a white solid. The solid was washed with methanol, and dried.

Additive E

Sodium hydroxide was added to 10.9 g of tetrabromobisphenol A to form a phenolate. Propane sultone (4.9 g) was added to the phenolate, and the mixture was stirred under heat to form a white solid. The solid was washed with methanol, and dried.

EXAMPLE 3

Each of the additives shown in Table 3 was added in the amounts indicated to the same polycarbonate powder as used in Example 1. Three types of test specimens were prepared and tested in the same way as in Example 1. The results are shown in Table 3.

Runs Nos. 1 to 11 in Table 3 used compositions of this invention which contained polycarbonates terminated with an alkyl group having a metal sulfonate group [compound (C)] as a fire retardant. Run No. 12 used a composition for comparative purposes which did not contain a fire retardant. Runs Nos. 13 and 14 used compositions for comparative purposes which contained as a fire retardant a polycarbonate derived from tetrabisphenol A and not containing a metal sulfonate group bonded to it. Runs Nos. 15 and 16 used compositions for comparative purposes which contained as a fire retardant a polycarbonate having a metal sulfonate group directly bonded to the aromatic ring.

The experimental results given in Table 3 show that the fire retardants in accordance with this invention impart to polycarbonate resins a satisfactory fire retarding effects rated as V-0 without impairing its transparency and impact strength, but that the comparative fire retardants which contain a metal sulfonate group directly bonded to the aromatic ring can give a fire retarding effect rated V-2, but not V-0, with a deleterious effect on transparency.

TABLE 3

| Run No. | Additive | Amount of additive (%) | Haze (%) | Izod impact strength (kg · cm/cm) | Average flame out time (seconds) | Drips per 10 contacts of flame | UL-94 rating |
|---|---|---|---|---|---|---|---|
| 1 |   | 0.1 | 1.1 | 80 | 5.5 | 0 | V-O |
| 2 | A | 0.2 | 1.1 | 80 | 1.8 | 0 | V-O |
| 3 |   | 1.0 | 1.3 | 78 | 0.5 | 0 | V-O |
| 4 |   | 0.1 | 1.1 | 80 | 5.1 | 0 | V-O |

TABLE 3-continued

| Run No. | Additive | Amount of additive (%) | Haze (%) | Izod impact strength (kg · cm/cm) | Average flame out time (seconds) | Drips per 10 contacts of flame | UL-94 rating |
|---|---|---|---|---|---|---|---|
| 5 | B | 0.2 | 1.1 | 80 | 1.5 | 0 | V-O |
| 6 | | 1.0 | 1.5 | 79 | 0 | 0 | V-O |
| 7 | | 01 | 1.1 | 80 | 5.5 | 0 | V-O |
| 8 | C | 0.2 | 1.2 | 80 | 3.1 | 0 | V-O |
| 9 | | 1.0 | 2.0 | 77 | 0 | 0 | V-O |
| 10 | | 01 | 2.0 | 80 | 4.5 | 0 | V-O |
| 11 | D | 0.2 | 2.5 | 77 | 1.0 | 0 | V-O |
| 12 (comparison) | None | 0 | 1.0 | 80 | 14.8 | 9 | HB |
| 13 (comparison) | | 0.1 | 1.1 | 75 | 21 | 12 | HB |
| 14 (comparison) | E | 1.0 | 2.0 | 75 | 15 | 8 | HB |
| 15 (comparison) | F | 0.25 | 4.6 | 80 | 5.3 | 6 | V-2 |
| 16 (comparison) | G | 0.25 | 10.0 | 77 | 4.9 | 3 | V-2 |

Note
The additives A to C used in Example 3 were as follows:

A: poly[2,2-bis(4-hydroxyphenyl)propane carbonate] containing a γ-potassium sulfopropyl terminal (with an average degree of polymerization of 3), B: poly[2,2-bis(3,5-dibromo-4-hyroxyphenyl) propane carbonate] containing a γ-potassium sulfopropyl terminal (with an average degree of polymerization of 3), C: polycarbonate resulting from th copolymerization of bisphenol with tetrabromobisphenol A and comtaining a γ-sodium sulfopropyl terminal (with an average degree of polymerization of 5), D: poly[2,2-bis(4-hydroxyphenyl)sulfone carbonate] containing a γ-sodium sulfopropyl terminal (with an average degree of polymerization of 3), E: poly[2,2-bis(3,5-dibromo-4-hydroxyphenyl) propane carbonate] (with an average degree of polymerization of 3), F: poly[2,2-bis(4-hydroxyphenyl)propane carbonate]having about 2, on an average per molecule, of sodium sulfonate groups bonded to the aromatic ring (with molecular weight of 4,500), G: poly[2,2-bis(3,5-dibromo-4-hydroxyphenyl) propane carbonte] having about 2, on an average per molecule, of sodium sulfonate groups bonded to the aromatic ring (with a molecular weight of 4,500)

The additives A and B used in Example 3 were synthesized by the following procedures.

Additive A

Hydroxy-terminated poly[2,2-bis(4-hydroxyphenyl) propane carbonate] (with an average degree of polymerization of 3) (7.5 g) was dissolved in 20 cc of acetone, and 2.4 g of propane sultone was added. The mixture was stirred under heat, and a solution consisting of 1.1 g of potassium hydroxide and 10 cc of water was added dropwise. Immediately then, a white solid precipitated. After the reaction, the solid was collected by filtration. The yield of the product was 90%.

Additive B

Hydroxy-terminated poly[2,2-bis(3,5-dibromo-4-hydroxyphenyl)propane carbonate] (with an average degree of polymerization of 3) (16.8 g) was reacted with 2.4 g of propane sultone in the same way as in the preparation of additive A above to form white crystals in a yield of 87%.

EXAMPLE 4

Each of the additives I (metal salts of sulfuric esters) and each of the additives II (halogen-containing organic compounds) shown in Table 4 were added in the amounts indicated to the same polycarbonate powder as used in Example 1. Each of the mixtures was pelletized and injection molded in the same way as in Example 1 to form four kinds of test specimens, i.e. a specimen A-I having a size of 127 mm×12.7 mm×3.2–6.4 mm, a specimen A-II having a size of 127 mm×127 mm×3.2–6.4 mm, a specimen B having a size of 70 mm×50 mm×2 mm, and a specimen C having a size of 64 mm×12.7 mm×3.2 mm.

Specimen A-I was used as a bar sample in the 5V test of UL-94; specimen A-II, as a plaque sample in the 5V test of UL-94; specimen B, in a test for transparency; and specimen C, in a test for impact strength. The results are shown in Table 4.

The experimental results given in Table 4 show that the compositions of Runs Nos. 1 to 18 containing the mixed fire retardants of this invention composed of additives I and II meet the rigorous criteria of the 5V test in accordance with UL-94.

TABLE 4

| Run No. | Additive I Type | Additive I Amount (%) | Additive II Type | Additive II Amount (%) | Haze (%) | Izod impact strength (kg·cm/cm) | UL-94, 5V test |
|---|---|---|---|---|---|---|---|
| 1 | A | 0.01 | D | 3.0 | 2.8 | 79 | Acceptable |
| 2 |   | 0.05 |   | 0.5 | 3.3 | 80 | " |
| 3 |   | 0.2 |   | 0.3 | 4.5 | 80 | " |
| 4 | B | 0.02 | E | 3.0 | 3.0 | 81 | " |
| 5 |   | 0.05 |   | 0.5 | 3.5 | 78 | " |
| 6 |   | 0.2 |   | 0.3 | 4.7 | 80 | " |
| 7 | C | 0.02 | F | 3.0 | 3.2 | 79 | " |
| 8 |   | 0.05 |   | 0.5 | 3.7 | 80 | " |
| 9 |   | 0.2 |   | 0.3 | 4.8 | 80 | " |
| 10 | A | 0.01 | G | 2.0 | — | 82 | " |
| 11 |   | 0.05 |   | 1.0 | — | 84 | " |
| 12 |   | 0.2 |   | 0.5 | — | 79 | " |
| 13 | B | 0.02 | H | 3.0 | — | 83 | " |
| 14 |   | 0.05 |   | 2.0 | — | 83 | " |
| 15 |   | 0.2 |   | 1.0 | — | 85 | " |
| 16 | C | 0.02 | I | 2.0 | — | 78 | " |
| 17 |   | 0.05 |   | 1.0 | — | 82 | " |
| 18 |   | 0.2 |   | 0.5 | — | 82 | " |
| 19 (comparison) | None | 0 | None | 0 | 1.0 | 80 | Unacceptable (burns) |
| 20 (comparison) | None | 0 | D | 3.0 | 1.0 | 78 | Unacceptable (burns) |
| 21 (comparison) | " | 0 | G | 2.0 | — | 81 | Unacceptable (burns) |
| 22 | A | 0.1 | None | 0 | 3.7 | 80 | Unacceptable (non-combustible but drips) |
| 23 | B | 0.1 | None | 0 | 3.5 | 80 | Unacceptable (non-combustible but drips) |
| 24 | C | 0.1 | None | 0 | 4.0 | 79 | Unacceptable (non-combustible but drips) |

Note
Additives A to I used in Example 4 were as follows:
A: sodium lauryl sulfate,
B: sodium hexadecyl sulfate,
C: potassium stearyl sulfate,
D: poly(2,2-bis(3,5-d bromo-4-hydroxyphenyl)propane carbonate),
E: decabromodiphenyl ether,
F: poly(2,2-bis(3,5-dichloro-4-hydroxyphenyl)propane carbonate),
G: polytetrafluoroethylene,
H: ethylene/tetrafluoroethylene copolymer,
I: polytrifluorochloroethylene

What we claim is:

1. A fire retardant resin composition comprising
(1) a polycarbonate which is the reaction product of a dihydric phenol with either phosgene or a carbonic acid diester, and
(2) as a fire retardant, at least one compound selected from the group consisting of compounds of the formula

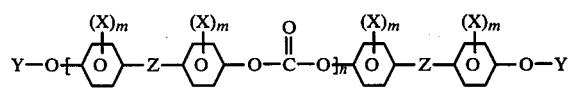

wherein X represents a halogen atom, m is an integer of 0 to 4, Y independently represents a hydrogen atom, an aliphatic or aromatic group containing 1 to 20 carbon atoms, or the group —R—SO$_3$M in which R represents an alkylene group containing 1 to 10 carbon atoms and M represents an alkali metal or an alkaline earth metal, at least one of the Y groups being the group —R—SO$_3$M, and Z represents an alkylene or alkylidene group containing 1 to 9 carbon atoms, a cycloalkylene or cycloalkylidene group containing 5 to 15 carbon atoms, O, S, SO, SO$_2$, CO or CO$_2$, and n is a number of 1 to 200.

2. The composition of claim 1 wherein the component (2) fire retardant compound of the formula is a polycarbonate derived from an unsubstituted or halogen-substituted dihydric phenol.

3. The composition of claim 2 wherein the dihydric phenol of the fire retardant polycarbonate component (2) and the polycarbonate (1) is bis-phenol A.

4. The composition of claim 1, 2, or 3 wherein the amount of the fire retardant compound (2) is at least 0.001% by weight, based on the weight of the polycarbonate (1).

5. The composition of claim 4 wherein the amount of the fire retardant compound (2) is from 0.01 to 2% by weight, based on the polycarbonate resin (1).

6. The composition of claim 1, wherein the fire retardant compound (2) is poly[2,2-bis(4-hydroxyphenyl) propane carbonate] containing a γ-potassium sulfopropyl radical with an average degree of polymerization of 3, said fire retardant compound being present in an amount of from 0.01 to 2% by weight, based on the polycarbonate resin (1).

7. The composition of claim 1, wherein the fire retardant compound (2) is poly[2,2-bis(3,5-dibromo-4-hydroxyphenyl) propane carbonate] containing a γ-potassium sulfopropyl radical with an average degree of polymerization of 3, said fire retardant compound being present in an amount of from 0.01 to 2% by weight, based on the polycarbonate resin (1).

8. The composition of claim 1, wherein the fire retardant compound (2) is polycarbonate resulting from the copolymerization of bisphenol A with tetrabromobisphenol A and containing a γ-sodium sulfopropyl radical with an average degree of polymerization of 5, said fire retardant compound being present in an amount of from 0.01 to 2% by weight, based on the polycarbonate resin (1).

9. The composition of claim 1, wherein the fire retardant compound (2) is poly[2,2-bis(4-hydroxyphenyl) sulfone carbonate] containing a γ-sodium sulfopropyl radical with an average degree of polymerization of 3, said fire retardant compound being present in an amount of from 0.01 to 2% by weight, based on the polycarbonate resin (1).

* * * * *